(12) United States Patent
Chang

(10) Patent No.: US 9,400,202 B2
(45) Date of Patent: Jul. 26, 2016

(54) MODULAR GAS LEVEL MEASURING DEVICE IN LIQUEFIED GAS TANK

(71) Applicant: GRAND GAS EQUIPMENT INCORPORATION, Taichung (TW)

(72) Inventor: Chin-Cheng Chang, Taichung (TW)

(73) Assignee: Grand Gas Equipment Incorporation, Taichung (TW)

( * ) Notice: Subject to any disclaimer, the term of this patent is extended or adjusted under 35 U.S.C. 154(b) by 227 days.

(21) Appl. No.: 14/217,602

(22) Filed: Mar. 18, 2014

(65) Prior Publication Data

US 2015/0268086 A1 Sep. 24, 2015

(51) Int. Cl.
*G01F 23/76* (2006.01)
*G01F 23/62* (2006.01)

(52) U.S. Cl.
CPC ........................... *G01F 23/62* (2013.01)

(58) Field of Classification Search
CPC .......... G01F 23/30; G01F 23/32; G01F 23/76
USPC ........... 73/305, 306, 307, 309, 311, 314, 317, 73/322.5
See application file for complete search history.

(56) References Cited

U.S. PATENT DOCUMENTS

| 4,092,861 | A | * | 6/1978 | Fling ............................... 73/311 |
| 5,294,917 | A | * | 3/1994 | Wilkins ........................ 340/625 |
| 5,479,820 | A | | 1/1996 | Fekete |
| 5,600,998 | A | * | 2/1997 | Dean, Jr. ........................ 73/309 |
| 6,370,951 | B1 | * | 4/2002 | Kerchaert et al. ............... 73/311 |
| 7,040,343 | B2 | * | 5/2006 | Tseng ............................ 137/390 |
| 7,921,873 | B2 | * | 4/2011 | Ross et al. .................... 137/447 |
| 2001/0029782 | A1 | * | 10/2001 | Articolo .......................... 73/314 |
| 2002/0023490 | A1 | * | 2/2002 | Burns ............................ 73/306 |
| 2011/0090088 | A1 | * | 4/2011 | Kenney et al. ................ 340/623 |
| 2015/0096367 | A1 | * | 4/2015 | Marriott et al. ................ 73/313 |

\* cited by examiner

*Primary Examiner* — Eric S McCall
(74) *Attorney, Agent, or Firm* — Alan D. Kamrath; Kamrath IP Lawfirm, P.A.

(57) ABSTRACT

A modular gas level measuring device in a liquefied gas tank includes a plurality of modular float assemblies releasably connecting together. Each of the plurality of modular float assemblies includes a float. A sensing assembly releasably connects with the plurality of modular float assemblies and includes a biasing member subject to weights of the plurality of modular float assemblies and with an original length. The biasing member deforms from the original length thereof and has various deformed lengths with respect to displacements of the plurality of modular float assemblies.

13 Claims, 9 Drawing Sheets

MODULAR GAS LEVEL MEASURING DEVICE IN LIQUEFIED GAS TANK

BACKGROUND OF THE INVENTION

1. Field of the Invention

The present invention relates to a gas level measuring device and, particularly, to a modular gas level measuring device in a liquefied gas tank.

2. Description of the Related Art

U.S. Pat. No. 5,479,820 shows a cryogenic gauge for measuring fluid level, especially cryogenic fluids. The gauge utilizes a float assembly which can be adjusted for the densities of various fluids. The float assembly includes a head assembly with a passageway to receive the upper portion of a lift rod assembly. The lift rod assembly includes a spring attached at the upper end to the head and attached at the lower end to a spring guide. A lift rod is mounted adjustably on the spring guide. The upper end of the lift rod has attached a magnet, and the lower end of the lift rod has attached a displacement member. The upper end of the lift rod is received in the passageway of the head. Attached to the head adjacent to the passageway is a dial assembly adjustably mounted in relation to the passageway of the head.

Conventionally, one float assembly size is made for one pressure vessel size. Therefore, different float assemblies are made in different molds. However, it is expensive to build a mold.

U.S. Pat. No. 5,479,820 shows a float that is made up of a set of washer-like sections which are held in position by lock nuts. The size and dimension of the float may be expanded or contracted by removing or adding washer-like sections. Although the float includes modular washer-like sections, a lift rod of one size is not feasible. Different amounts of washer-like sections would be utilized in small pressure vessels in order to obtain accurate measurements. However, the lift rod for the small pressure vessel would be too short to receive more washer-like sections in the big pressure vessel.

The present invention is, therefore, intended to obviate or at least alleviate the problems encountered in the prior art.

SUMMARY OF THE INVENTION

According to the present invention, a modular gas level measuring device in a liquefied gas tank includes a plurality of modular float assemblies releasably connecting together. Each of the plurality of modular float assemblies includes a float. A sensing assembly releasably connects with the plurality of modular float assemblies and includes a biasing member subject to weights of the plurality of modular float assemblies and with an original length. The biasing member deforms from the original length thereof and has various deformed lengths with respect to displacements of the plurality of modular float assemblies.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and devices for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure. The abstract is neither intended to define the invention, which is measured by the claims, nor is it intended to be limiting as to the scope of the invention in any way.

It is therefore an object of the present invention to provide a modular gas level measuring device for a liquefied gas tank.

It is another object of the present invention to provide a modular gas level measuring device that can take measures accurately.

Other objects, advantages, and new features of the present invention will become apparent from the following detailed description of the invention when considered in conjunction with the accompanied drawings.

DETAILED DESCRIPTION OF THE INVENTION

Figure 1:
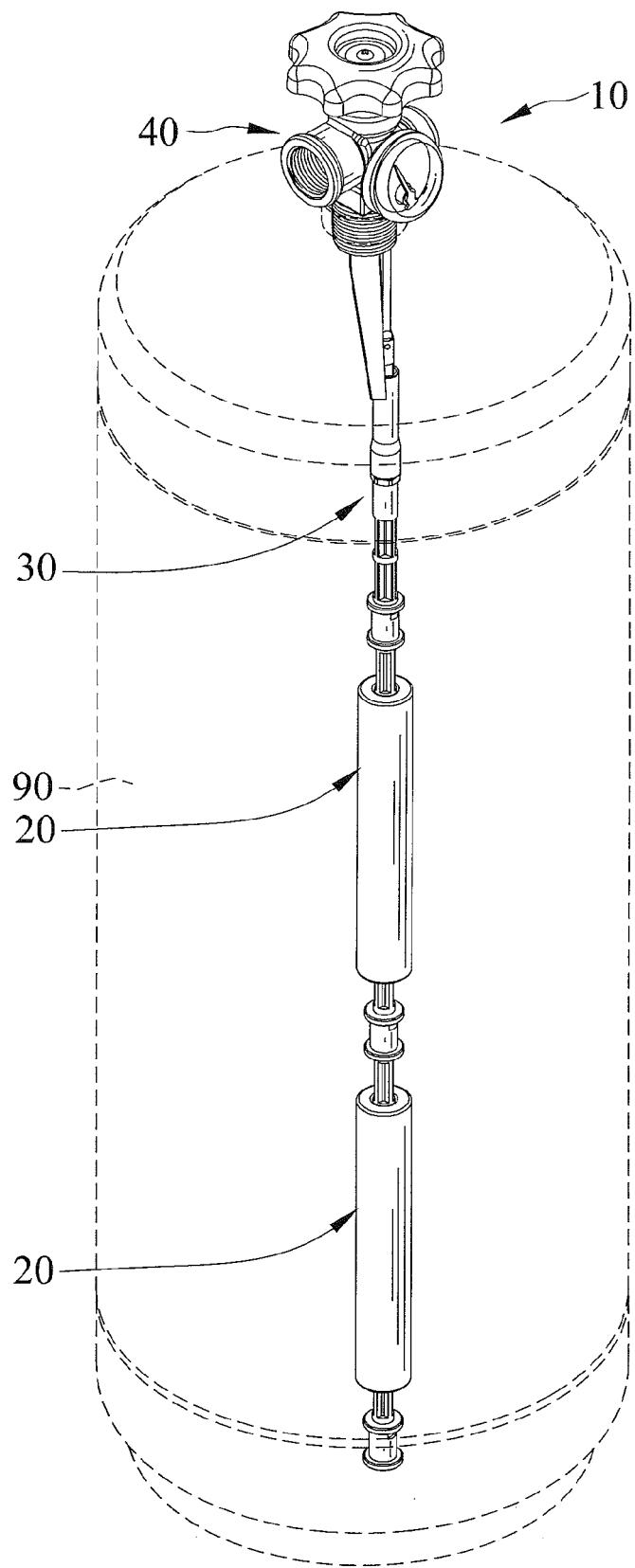
FIG. 1 is a perspective view of a modular gas level measuring device in a liquefied gas tank in accordance with a first embodiment of the present invention, with the liquefied gas tank shown in phantom.
Figure 2:
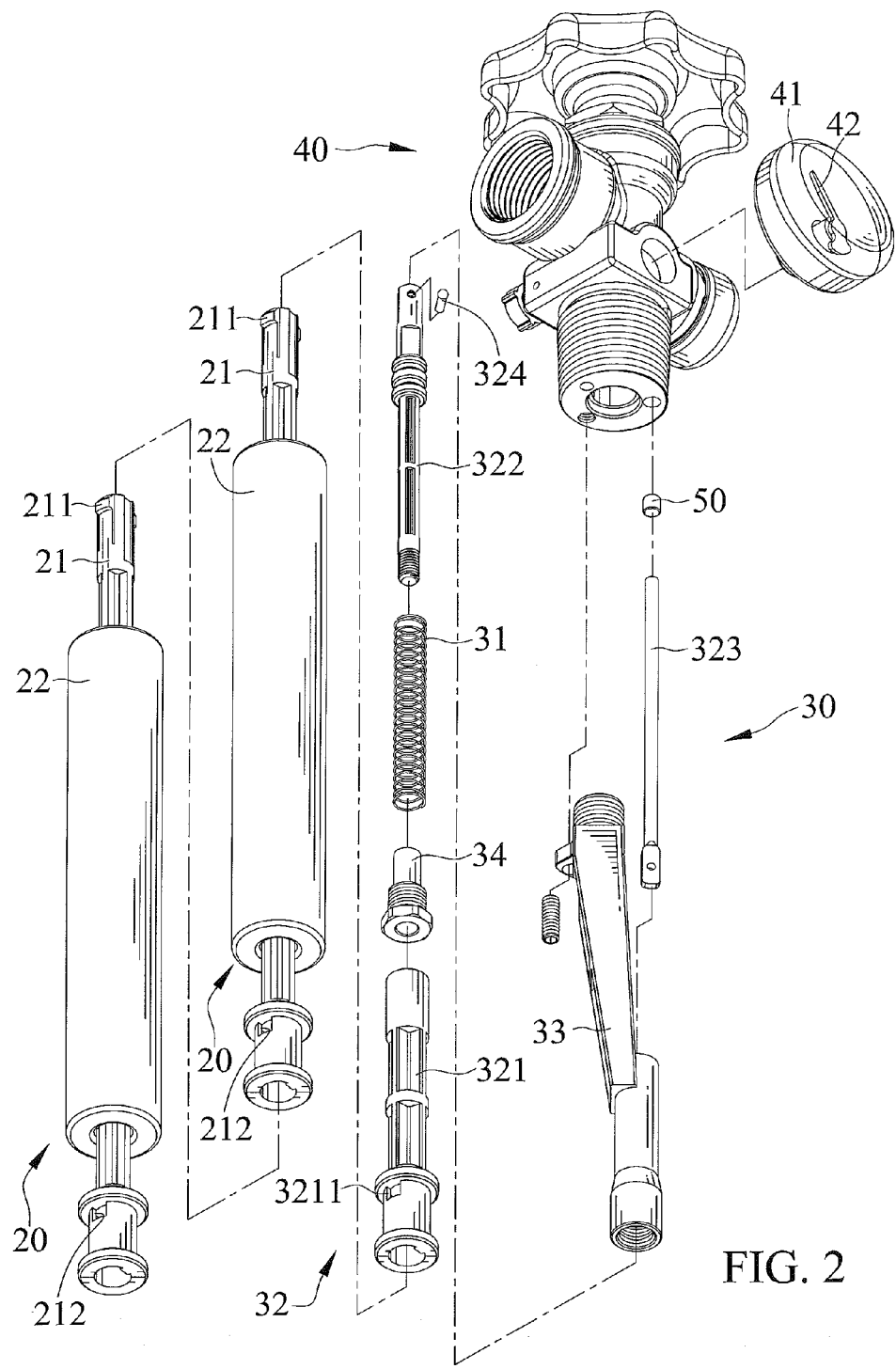
FIG. 2 is an exploded perspective view of the modular gas level measuring device.
Figure 3:
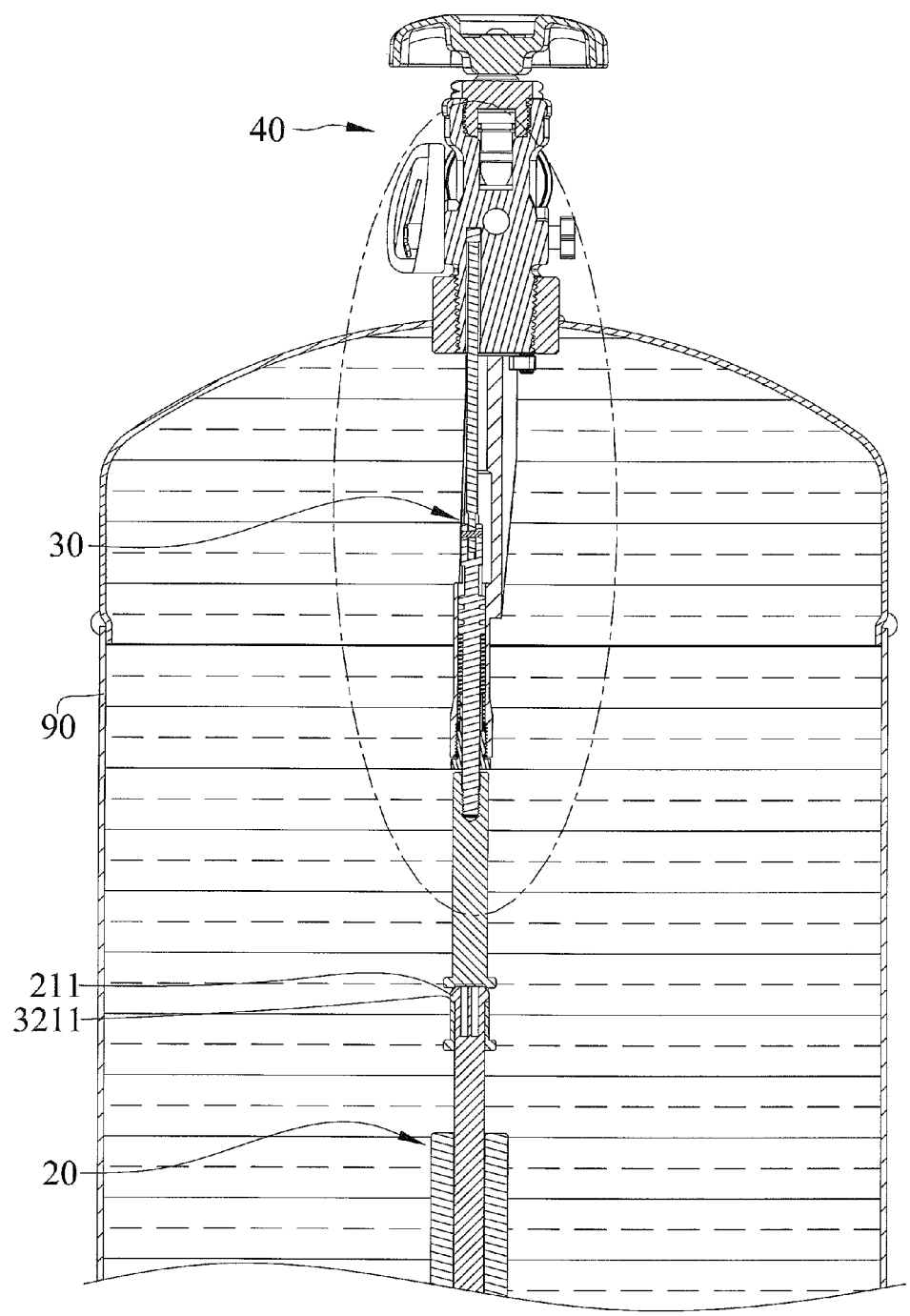
FIG. 3 is a partial, cross-sectional view of FIG. 1.
Figure 4:
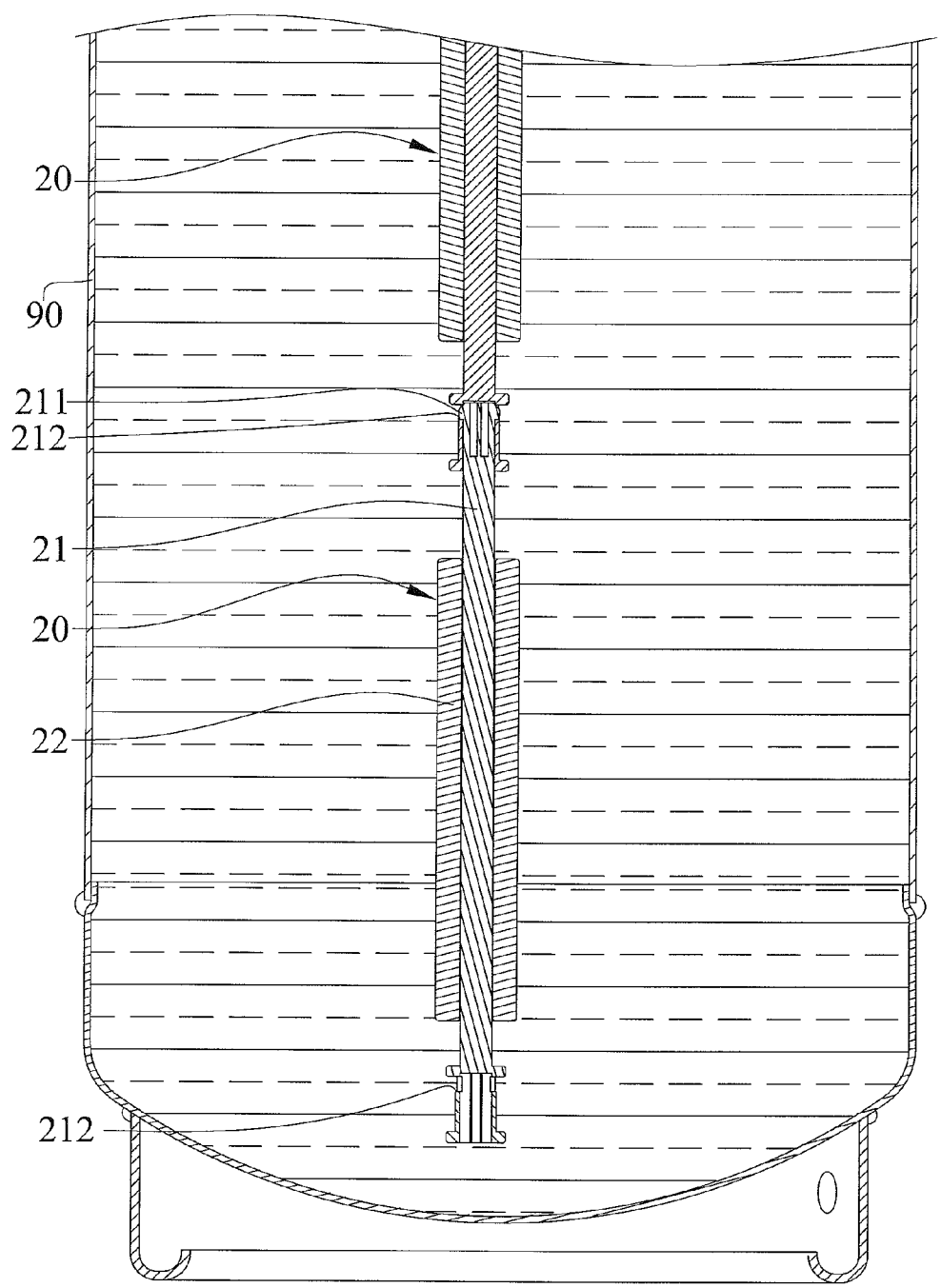
FIG. 4 is another partial, cross-sectional view of FIG. 1.
Figure 5:
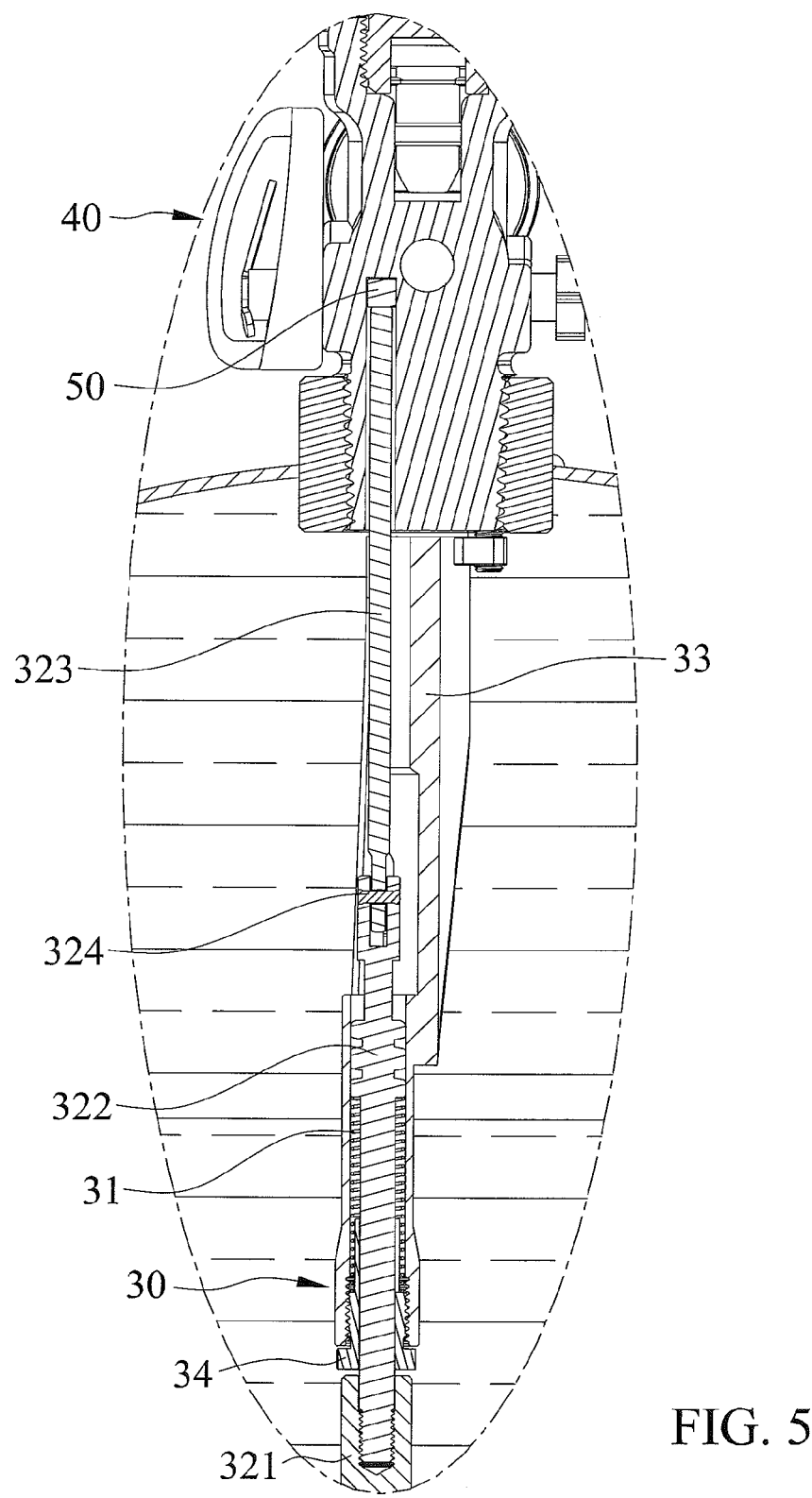
FIG. 5 is an enlarged cross-sectional view of FIG. 3.
Figure 6:
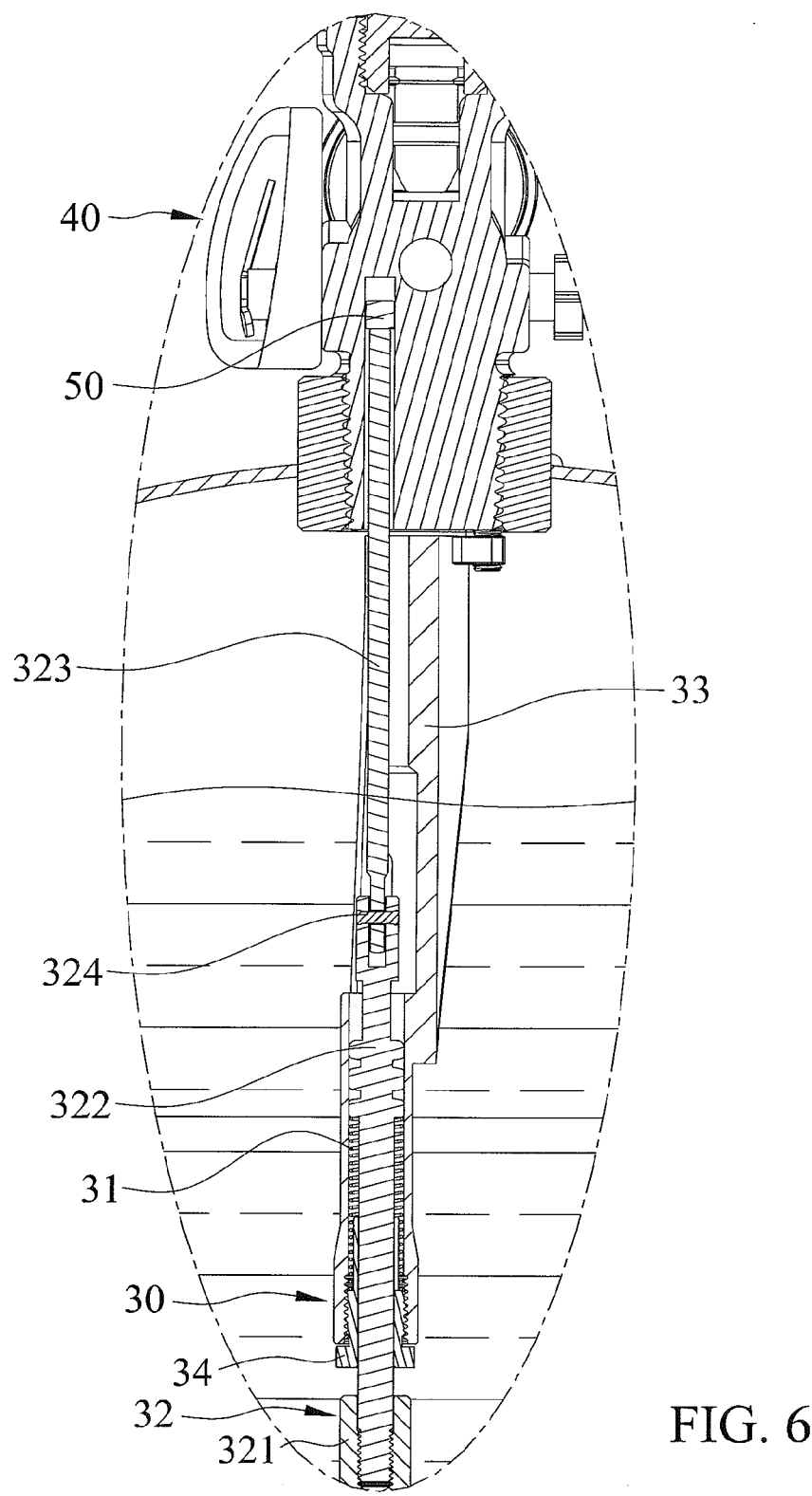
FIG. 6 is an extended cross-sectional view of FIG. 5, with the modular gas level measuring device indicating the liquid gas tank with a lower gas level than that of FIG. 5.

FIGS. 1 through 6 show a modular gas level measuring device 10 in a liquefied gas tank 90 in accordance with a first embodiment of the present invention.

The modular gas level measuring device 10 includes a plurality of modular float assemblies 20 releasably connecting together. The plurality of modular float assemblies 20 connect together in series. The plurality of modular float assemblies 20 is disposed one above another. Each of the plurality of modular float assemblies 20 includes a float 22. Each of the plurality of modular float assemblies 20 also includes a float arm 21 receiving the float 22. Two adjacent of the plurality of modular float assemblies 20 are connected together by the float arms 21 thereof, with each float arm 21 including a protrusion 211 at an end thereof and a slot 212 at another end thereof, and with the protrusion 211 of one float arm 21 releasably retaining in the slot 212 of the other float arm 21. Each of the plurality of modular float assemblies 20 includes the float 22 with a first longitudinal length and the float arm 21 with a second longitudinal length longer than the first longitudinal length. The float arm 21 extends through the float 22. The material of the float 22 is PU.

A sensing assembly 30 releasably connects with the plurality of modular float assemblies 20. The sensing assembly 30 and the plurality of modular float assemblies 20 connect together in series. The displacements of the plurality of modular float assemblies 20 are determined by gas levels in the liquefied gas tank 90. The plurality of modular float assemblies 20 disposed within the liquefied gas tank 90 is subject to buoyancy exerted by gas in the liquefied gas tank 90. Buoyancy is an upward force exerted by a fluid that opposes the weight of an immersed object. The buoyancy is greater if there is more liquefied gas in the liquefied gas tank 90. The buoyancy is smaller if there is less liquefied gas in the liquefied gas tank 90. The sensing assembly 30 includes a biasing member 31 subject to weights of the plurality of modular float assemblies 20 and with an original length. The biasing member 31 is a spring and includes a plurality of coaxial coils. The biasing member 31 deforms from the original length thereof and has various deformed lengths with respect to displacements of the plurality of modular float assemblies 20. The sensing assembly 30 includes a lift mechanism 32 engaging with the biasing member 31 and connecting with the plurality of modular float assemblies 20 and a valve assembly 40. The lift mechanism 32 moves with the plurality of modular float assemblies 20. The lift mechanism 32 includes a first section 321, a second section 322 and a third section 323 fit together. The lift mechanism 32 includes the first section 321 to which the plurality of modular float assemblies 20 join, the second section 322 keeping the biasing member 31 and the third section 323 to which the valve assembly 40 joins respectively. The first section 321 includes a slot 3211 at an end thereof releasably retaining the protrusion 211 of the float arm 21 of an adjacent one of the plurality of modular float assemblies 20. The second and third sections 322 and 323 are joined together by a fastener 324. The second section 322 inserts through the biasing member 31. The third section 323 includes a magnet 50 fit thereto. The magnet 50 moves with the lift mechanism 32 and the plurality of modular float assemblies 20 and magnetically engages with a dial 42 of the gauge 41. Displacements of the magnet 50 determine the magnitude of a magnetic force on moving the dial 42 and the displacements of the float assemblies 20.

The sensing assembly 30 includes a first seat 33 forming a sleeve section receiving the biasing member 31 and the lift mechanism 32 and fitting to the valve assembly 40. The first seat 33 and the valve assembly 40 are in thread engagement with each other. The lift mechanism 32 is movable relative to the first seat 33.

The sensing assembly 30 includes a second seat 34 fitting to the lift mechanism 32 and limiting the biasing member 31, with the biasing member 31 including an end abutting against the second seat 34. The second seat 34 fits to the first seat 33. The second section 322 of the lift mechanism 32 includes a joining end, which connects with the first section 321 of the lift mechanism 32, extending through the second seat 34.

The liquefied gas tank 90 includes an exit, and the valve assembly 40 fits to the exit. The valve assembly 40 includes gauge 41 fit thereto. The valve assembly 40 includes a channel inside and extending therethrough for allowing gas inside the liquefied gas tank 90 to flow. The channel connects and is in fluid communication with the inside of the liquefied gas tank 90. Gas inside the liquefied gas tank 90 is discharged through the channel of the valve assembly 40 when the valve assembly 40 is installed to the liquefied gas tank 90. The valve assembly 40 includes a knob operable to a first position blocking the channel and to a second position disengaging from the channel.

In use of the modular gas level measuring device in the tank 90, changes of gas levels of the gas tank 90 will cause displacements of the modular float assembly 20. When the modular float assembly 20 move, the lift mechanism 32 moves therewith, and the magnet 50, moving with the lift mechanism 32 and the modular float assembly 20, will render different measurement readings on the gauge 41.

Figure 7:
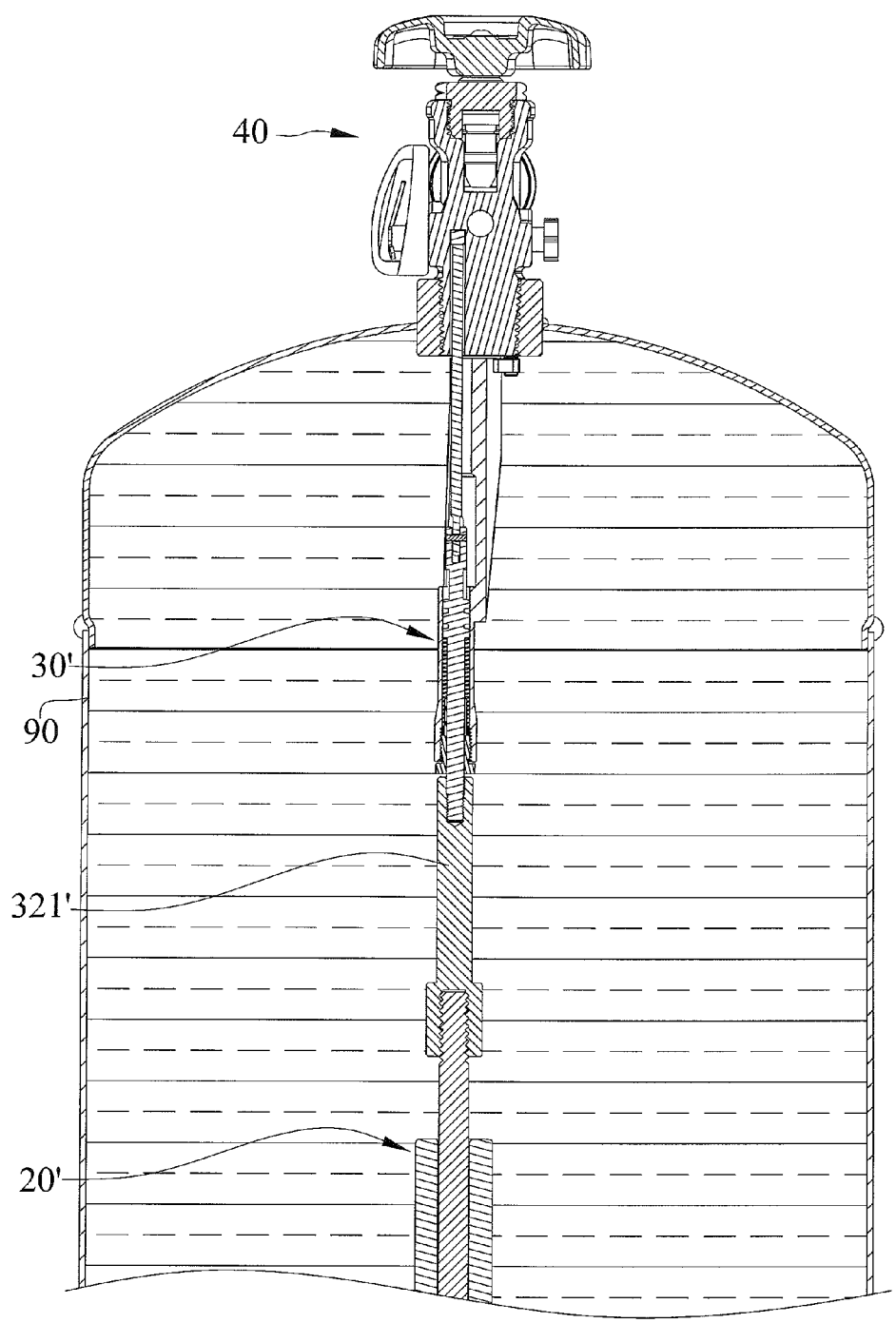
FIG. 7 is a partial, cross-sectional view of a modular measuring device in a liquefied gas tank in accordance with a second embodiment of the present invention.
Figure 8:
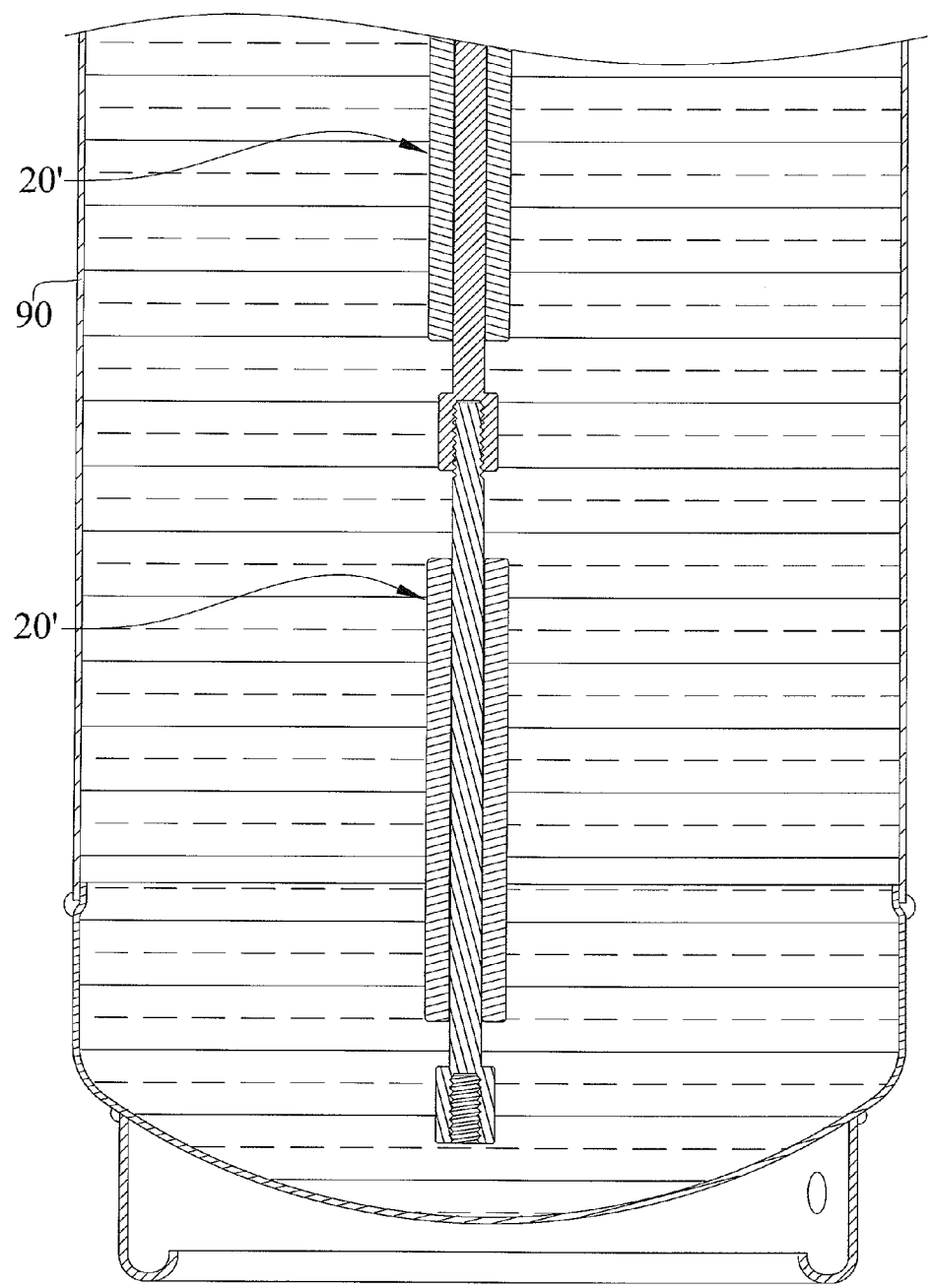
FIG. 8 is another partial, cross-sectional view of the modular measuring device in the liquefied gas tank of FIG. 6.

FIGS. 7 and 8 show a modular gas level measuring device in a liquefied gas tank in accordance with a second embodiment of the present invention, and same numbers are used to correlate similar components of the first embodiment, but bearing a '. The second embodiment differentiates from the first embodiment in that a plurality of modular float assemblies 20' are in thread engagement with each other and a sensing assembly 30' having a first section 321' and that the plurality of modular float assemblies 20' are in thread engagement with each other.

Figure 9:
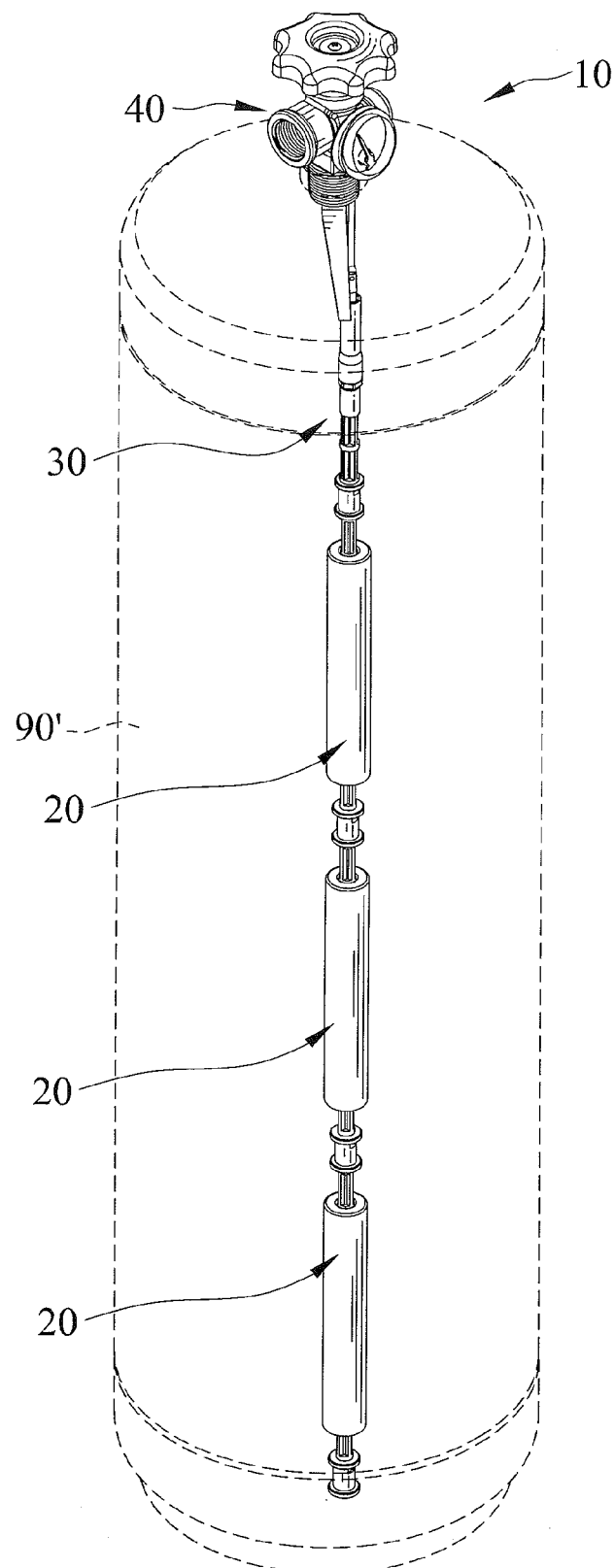
FIG. 9 is a perspective view of a modular gas level measuring device in a liquefied gas tank in accordance with a third embodiment of the present invention, with the liquefied gas tank shown in phantom.

FIG. 9 shows a modular gas level measuring device in a liquefied gas tank in accordance with a third embodiment of the present invention. FIG. 9 shows a liquefied gas tank 90' bigger than the gas tank 90. The gas tank 90' has a height substantially greater than that of the gas tank 90, so three modular float assemblies 20 are utilized.

In view of the forgoing, changes of gas levels of gas tanks 90 and 90' will cause displacements of the modular float assemblies 20 and 20'. When the modular float assemblies 20 and 20' move, the lift mechanism 32 moves therewith, and the magnet 50, moving with the lift mechanism 32 and the modular float assemblies 20 and 20', will render different measurement readings on the gauge 41.

Additionally, the cost of building the modular gas level measuring device 10 in the liquefied gas tank 90 is substantially reduced, because the modular float assemblies 20 are selectively installed and because there is no need to modify the sensing assembly 30 for liquefied gas tanks 90 and 90' of different sizes. Likewise, there is no need to modify the valve assembly 40 for liquefied gas tanks 90 and 90' of different sizes.

Furthermore, with the two modular float assemblies 20 in the liquefied gas tank 90 and one extra modular float assemblies 20 in the bigger liquefied gas tank 90', gas levels in the liquefied gas tanks 90 and 90' are measured more accurately than a conventional method, in which a gas level measuring device utilizes one float, assembly. Furthermore, the biasing member 31 can be adjusted to vary its spring constant for different liquefied gas.

While the specific embodiments have been illustrated and described, numerous modifications come to mind without significantly departing from the spirit of invention, and the scope of invention is only limited by the scope of accompanying claims.

What is claimed is:

1. A modular gas level measuring device in a liquefied gas tank comprising:
   a plurality of modular float assemblies releasably connecting together, with each of the plurality of modular float assemblies including a float; and a sensing assembly releasably connecting with the plurality of modular float assemblies and including a biasing member subject to weights of the plurality of modular float assemblies and with an original length;

wherein the biasing member deforms from the original length thereof and has various deformed lengths with respect to displacements of the plurality of modular float assemblies; and wherein the sensing assembly includes a first connecting end connecting with the plurality of modular float assemblies and a second connecting end connecting with a valve assembly.

2. The modular gas level measuring device as claimed in claim 1, wherein the plurality of modular float assemblies connects together in series, and wherein the sensing assembly and the plurality of modular float assemblies connect together in series.

3. The modular gas level measuring device as claimed in claim 1, wherein each of the plurality of modular float assemblies includes a float arm receiving the float, with two adjacent of the plurality of modular float assemblies connected together by the float arms thereof.

4. The modular gas level measuring device as claimed in claim 3, wherein each of the plurality of modular float assemblies includes the float with a first longitudinal length and the float arm with a second longitudinal length longer than the first longitudinal length, and wherein the float arm extends through the float.

5. The modular gas level measuring device as claimed in claim 1, wherein the sensing assembly includes a lift mechanism engaging with the biasing member and connecting with the plurality of modular float assemblies and the valve assembly, wherein the lift mechanism includes a first section to which the plurality of modular float assemblies join, a second section keeping the biasing member and a third section to which the valve assembly joins respectively, and wherein the lift mechanism moves with the plurality of modular float assemblies.

6. The modular gas level measuring device as claimed in claim 5, wherein the valve assembly includes gauge fit thereto and a channel inside and extending therethrough for allowing gas inside the liquefied gas tank to flow, wherein the third section of the lift mechanism includes a magnet fit thereto, and wherein the magnet moves with the lift mechanism and the plurality of modular float assemblies and magnetically engages with a dial of the gauge, with displacements of the magnet determining the magnitude of a magnetic force on moving the dial and the displacements of the float assemblies.

7. The modular gas level measuring device as claimed in claim 5, wherein the sensing assembly includes a first seat forming a sleeve section receiving the biasing member and the lift mechanism and fitting to the valve assembly.

8. The modular gas level measuring device as claimed in claim 7, wherein the sensing assembly includes a second seat having various adjusting positions on the lift mechanism and limiting the biasing member, with the biasing member including an end abutting against the second seat, and wherein the second seat fits to the first seat.

9. The modular gas level measuring device as claimed in claim 8, wherein the second section of the lift mechanism includes a joining end, which connects with the first section of the lift mechanism, extends through the second seat.

10. A modular gas level measuring device in a liquefied gas tank comprising:
a plurality of modular float assemblies releasably connecting together, with each of the plurality of modular float assemblies including a float; and
a sensing assembly releasably connecting with the plurality of modular float assemblies and including a biasing member subject to weights of the plurality of modular float assemblies and with an original length;
wherein the biasing member deforms from the original length thereof and has various deformed lengths with respect to displacements of the plurality of modular float assemblies; and
wherein the material of the float is PU.

11. A modular gas level measuring device in a liquefied gas tank comprising:
a plurality of modular float assemblies releasably connecting together, with each of the plurality of modular float assemblies including a float; and
a sensing assembly releasably connecting with the plurality of modular float assemblies and including a biasing member subject to weights of the plurality of modular float assemblies and with an original length;
wherein the biasing member deforms from the original length thereof and has various deformed lengths with respect to displacements of the plurality of modular float assemblies; and
wherein the plurality of modular float assemblies is in thread engagement with each other, and wherein the sensing assembly and the plurality of modular float assemblies are in thread engagement with each other.

12. A modular gas level measuring device in a liquefied gas tank comprising:
a plurality of modular float assemblies releasably connecting together, with each of the plurality of modular float assemblies including a float; and
a sensing assembly releasably connecting with the plurality of modular float assemblies and including a biasing member subject to weights of the plurality of modular float assemblies and with an original length;
wherein the biasing member deforms from the original length thereof and has various deformed lengths with respect to displacements of the plurality of modular float assemblies; and
wherein each of the plurality of modular float assemblies includes a float arm receiving the float, with two adjacent of the plurality of modular float assemblies connected together by the float arms thereof; and
wherein the float arm includes a protrusion at an end thereof and a first slot at another end thereof, and with the protrusion of the float arm releasably retaining in the first slot of the other float arm.

13. The modular gas level measuring device as claimed in claim 12, wherein the sensing assembly includes a second slot at an end thereof releasably retaining the protrusion of the float arm of adjacent one of the plurality of modular float assemblies.

* * * * *